Figure 1:
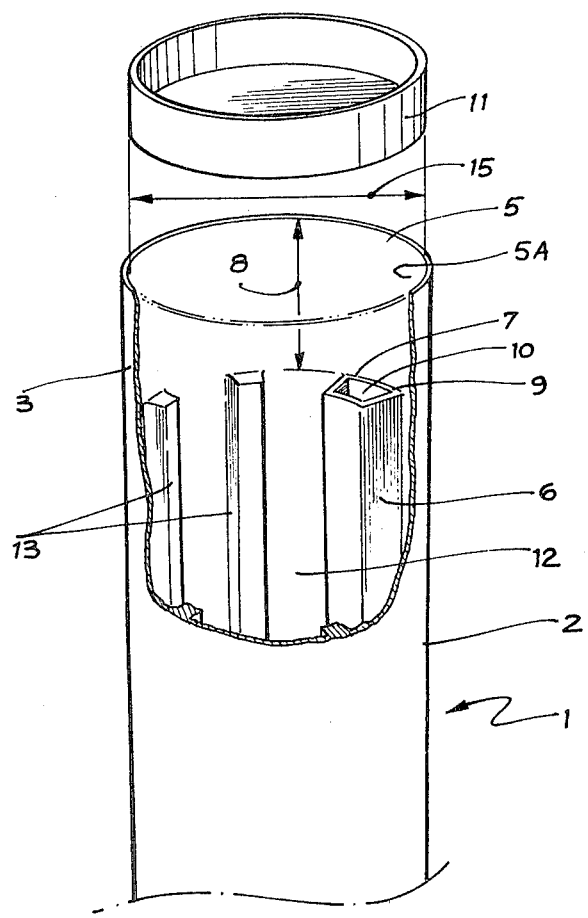

United States Patent [19]
Scott

[11] Patent Number: 4,477,208
[45] Date of Patent: Oct. 16, 1984

[54] CHEMICAL ANCHOR CARTRIDGES
[75] Inventor: Graham Scott, Sydney, Australia
[73] Assignee: Steetley Industries Ltd., Australia
[21] Appl. No.: 283,097
[22] Filed: Jul. 13, 1981
[30] Foreign Application Priority Data
  Jul. 15, 1980 [AU] Australia .................. PE4532
[51] Int. Cl.³ .................. E21D 21/00; B65D 25/08
[52] U.S. Cl. .................. 405/261; 206/219
[58] Field of Search .................. 405/261, 259, 260; 206/219, 503

[56] References Cited
U.S. PATENT DOCUMENTS 2,409,692 10/1946 Nyberg .................. 206/503 X
3,369,691 2/1968 Tohchung Wei .................. 206/503 X
4,303,354 12/1981 McDowell .................. 405/261
4,341,301 7/1982 Meyers et al. .................. 405/261 X

FOREIGN PATENT DOCUMENTS 1443030 7/1976 United Kingdom .................. 405/261
353046 11/1972 U.S.S.R. .................. 405/261

Primary Examiner—Dennis L. Taylor
Attorney, Agent, or Firm—Darby & Darby

[57] ABSTRACT

A chemical anchor cartridge for fixing a bar or rock bolt in a drillhole has a destructible outer envelope and includes first and second longitudinal compartments for containing respective components of an adhesive. Each end of the cartridge is adapted to be secured to a respective mating end of another cartridge so as to enable the cartridge to be assembled in end-to-end relationship outside the drillhole.

7 Claims, 1 Drawing Figure

CHEMICAL ANCHOR CARTRIDGES

This invention relates to improvements in chemical anchor cartridges.

Chemical anchors have over recent years found extensive use for the purpose of securing objects in holes. Normally they comprise a filled resin material plus a hardener (catalyst) which may be housed in separate containers or in separate compartments in one container. The container or containers usually called cartridges are inserted into pre-drilled holes following which an object such as a bar, rock bolt, or the like is inserted in the hole. The insertion and rotation of the bar in the hole breaks the cartridge or cartridges, and mixes the two components together. The mixture rapidly converts into a solidified mass and so locks the bar or bolt in the hole.

Anchors of this type find extensive use in mining operations as it has been found that the components of the mix penetrate the minute fissures and cracks in the area of the pre-drilled hole and firmly lock the object, in this case a rock bolt in position.

Various types of cartridges have been used to house the chemical components of the anchor system.

According to one such proposal, the cartridges comprise two separate destructible tubes of plastic foil, one component of the anchor system is housed in one tube whilst the other component is housed in the other. The two tubes are inserted in the pre-drilled hole and the procedure previously outlined followed.

According to another proposal the filled resin component is accomodated in a cartridge of the foil tube type and the hardener component is accomodated in a glass tube located within the foil tube.

These prior art cartridges are typical of those in use and they suffer from the disadvantage that when inserting them into overhead drill holes in mines, no simple means has, until this invention been available to retain them at the top of the hole while the bolt is being inserted therein.

In certain cases it is also desirable to insert a number of cartridges in one drill hole in order to achieve an extended bond along the length of the hole and similar difficulties have also been encountered. According to one proposal a number of cartridges are loaded into a plastic tube. The tube is then brought into register with the drill hole and the cartridges blown into the hole with an air jet or air ram.

The present invention has for its object the provision of an improved cartridge for use with chemical anchor systems. While not limited thereto it is particularly useful for the securing of rock bolts in position in mines as it is so devised that the cartridge or array of interconnected cartridges can be held on the end of a bolt to facilitate the insertion of the cartridge or cartridges into a drill hole.

Further objects and advantages will become apparent from a reading of the description herein following.

In one broad form this invention discloses a chemical anchor cartridge for fixing a bar, rock bolt or the like in a drill hole, the cartridge comprising a destructible outer envelope and including at least one compartment for containing one or more components of an adhesive, each end of the cartridge being adapted to be secured to a respective mating end of another said cartridge to enable a plurality of said cartridges to be assembled in end to end relationship.

A preferred embodiment of a cartridge in accordance with the invention is shown schematicaly in FIG. 1. The cartridge is indicated generally as 1 and consists of an outer envelope 2 which for the purposes of the illustration has been partially cut away as indicated by the edge 3. The cartridge 1 may be formed by extrusion blow moulding, injection moulding, or reaction injection moulding and made from filled or unfilled thermoplastic or thermosetting synthetic resin. Typical resins used for this purpose are:

Unsaturated Polyester
Polyethylene,
Polyurethane
P.V.C.
Polypropylene
Nylon
Polyester The cartridge shown in the embodiment is cylindrical in shape to facilitate insertion into a drill-hole or the like and is closed at one end 4. This closed end is moulded as an integral part of the cartridge 1 however clearly the same effect could be accompolished by a separate fitted end cap. The other end of the cartridge 1 is open. As shown through the cut out portion of the outer envelope 2 as delineated by the edge 3 the interior wall 5A of the cartridge includes a longitudinal partition 6. This partition 6 while only partially shown extends substantially along the interior length of the cartridge 1. The lower end of the partition 6 sealingly engages the closed end 4 of the cartridge 1 and the upper end 7 of the partition 6 terminates a short distance 8 from the open end 5 of the cartridge. In the embodiment shown this distance is approximately twenty millimeters. It is to be understood however that this distance 8 is a matter of design preference only and in no way limits the scope of this invention. One wall 9 of the partition 6 is moulded as an integral part of the interior wall 5A of the cartridge. The upper end 7 of the partition 6 is generally flat and is adapted to sealingly abut against the lower face of a hollow cap 11 which is a press fit into the open end 5 of the cartridge and bears up against the end 7 of the partition 6. With the cap 11 in place the partition 6 therefore divides the interior of the cartridge into two compartments 10 and 12 for holding separate components of a two part adhesive such as a Polyester Resin with the filler calcium carbonate stored in compartment 12 and the hardener Benzoyl Peroxide stored separately in compartment 10. There are also provided along the interior wall 5A of the cartridge and integral with it longitudinal ribs 13 which extend substantially along the interior length of the cartridge and terminate as shown a distance 8 from the open end 5 of the cartridge so as to abut against the lower face of the hollow cap 11 in like manner as the end 7 of the partition 6. In this embodiment five of these ribs 13 are provided around the inside wall of the cartridge in parallel spaced relationship, however for the purposes of illustration only two ribs 13 have been shown. While perhaps not immediately recognizable from FIG. 1, the diameter 14 of the closed end 4 is smaller than the diameter 15 of the open end 5 of the cartridge. The difference in these diameters being such as to allow the smaller closed end of a second cartridge according to this embodiment (not shown) to be inserted into the open end 5, with the closed end of the second cartridge abutting the inset hollow cap 11. The diameter 15 may also be suitably chosen to allow the cartridge 1 to be retained on a bar, rock bolt, or the like by enabling the end of the bar etc. to be inserted into the open end 5.

In use when it is desired to fix a bar or rock bolt in a drill hole one end of the bar or bolt is inserted into the open end 5 of the cartridge. The cartridge may be used alone or as one of a series in which case succeeding cartridges are arranged in end to end relationship with the smaller closed end (designated 4 in FIG. 1) of each being fitted into the larger open end (designated 5 in FIG. 1) of a succeeding one. Thus, it will be appreciated that one, or a plurality of such cartridges can be quite simply retained on the end of a bar, or rock bolt in end to end relationship for convenient insertion in over head or other hard to reach drill holes. After insertion the cartridges are automatically located in proper position within the drill hole for destruction by further insertion and rotation of the bar. It has been found that the provision of the ribs 13 facilitate the break up of the cartridge and mixing of the components.

The embodiment described is but one example of this invention and various modification obvious to a man skilled in the art could can be made without departing from its scope. For example although the described cartridge is circular in cross-section and tapered from end to end clearly other designs could be used. For example the cartridge could be hexagonal in cross-section and the difference in transverse dimension between the two ends could be achieved by means of a stepped configuration or perhaps by the use of end portions or end caps of enlarged and/or reduced diameter.

I claim:

1. A chemical anchor cartridge comprising an outer envelope which is destructable by engagement with a bar or bolt and including a first longitudinal compartment for containing one or more components of an adhesive and a second longitudinal compartment for containing one or more other components of the adhesive, each end of said cartridge being adapted to be secured to a respective mating end of another cartridge to enable a plurality of said cartridges to be assembled in end-to-end relationship outside the drillhole, at least a first end of each cartridge being adapted to be retained on the end of the bar or rock bolt, said first end portion of each cartridge being of larger transverse dimension than a second end portion of the cartridge and including a concavity adapted to receive therein in mating relationship, the smaller dimensioned second end portion of another cartridge or the end of said bar or rock bolt, the first end portion of larger transverse dimension being open and adapted to receive a plug inserted therein to seat within the cartridge at a predetermined distance from said first end to form the concavity, the first and second compartments ending at a predetermined distance from said first end.

2. A chemical cartridge as claimed in claim 1 wherein at least one of the end portions is formed by varying the transverse dimension of the cartridge in a stepped configuration.

3. A chemical anchor cartridge as claimed in claim 1 wherein at least one of the end portions is integral with the cartridge.

4. A chemical anchor cartridge as claimed in claim 1 wherein at least one of the end portions comprises an end cap connectible with the cartridge.

5. A chemical anchor cartridge as claimed in claim 1 wherein the cartridge is closed at the smaller dimensioned end portion and includes at least one longitudinal partition wall sealed at one end thereof to said closed end of the cartridge, the other end of said at least one partition wall being adapted to abut against said plug to divide the cartridge into said first and second compartments.

6. A chemical anchor cartridge as claimed in claim 1 wherein the interior and/or exterior of the cartridge are provided with a plurality of longitudinal ribs spaced around the periphery of the cartridge.

7. A chemical anchor cartridge for fixing a bar, or rock bolt, in a drill hole, the cartridge comprising an outer envelope which is destructable by engagement with a bar or bolt, and including a first longitudinal compartment for containing one or more components of an adhesive and a second longitudinal compartment for containing one or more other components of the adhesive, each end of said cartridge being adapted to be secured to a respective mating end of another cartridge to enable a plurality of said cartridges to be assembled in end-to-end relationship outside the drillhole, and the interior and/or exterior of the cartridge being provided with a plurality of longitudinal ribs spaced around the periphery of the cartridge.

* * * * *